US006835936B2

(12) United States Patent
Okada et al.

(10) Patent No.: US 6,835,936 B2
(45) Date of Patent: Dec. 28, 2004

(54) SCINTILLATOR PANEL, METHOD OF MANUFACTURING SCINTILLATOR PANEL, RADIATION DETECTION DEVICE, AND RADIATION DETECTION SYSTEM

(75) Inventors: Satoshi Okada, Kanagawa (JP); Yoshihiro Ogawa, Tokyo (JP); Katsuro Takenaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 10/061,319

(22) Filed: Feb. 4, 2002

(65) Prior Publication Data

US 2002/0162965 A1 Nov. 7, 2002

(30) Foreign Application Priority Data

Feb. 7, 2001 (JP) ........................................ 2001-031164
Sep. 7, 2001 (JP) ........................................ 2001-272024

(51) Int. Cl.[7] ............................................... G01T 1/24
(52) U.S. Cl. ............................. 250/370.11; 250/370.01; 250/336.1
(58) Field of Search ....................... 250/370.11, 370.01, 250/336.1

(56) References Cited

U.S. PATENT DOCUMENTS

| 4,195,230 | A | | 3/1980 | Ataka et al. ................. 250/483 |
| 6,160,259 | A | * | 12/2000 | Petrillo et al. ........... 250/363.07 |
| 6,277,489 | B1 | * | 8/2001 | Abbott et al. ................. 428/403 |
| 6,469,307 | B2 | * | 10/2002 | Takabayashi et al. .. 250/370.11 |
| 6,573,506 | B2 | * | 6/2003 | Sato et al. ................. 250/361 R |
| 2002/0017613 | A1 | * | 2/2002 | Homme et al. ......... 250/370.11 |
| 2003/0127709 | A1 | * | 7/2003 | Lippmann et al. .......... 257/642 |
| 2003/0160041 | A1 | * | 8/2003 | Hiramatsu ................ 219/444.1 |

FOREIGN PATENT DOCUMENTS

| JP | 53-122356 | 10/1978 |
| JP | 10-160898 | 6/1998 |

OTHER PUBLICATIONS

Hass G. "Filmed Surfaces for Reflecting Optics," Journal of the Optical Society of America, vol. 45, No. 11, pp. 945–952, Nov. 1955.

* cited by examiner

Primary Examiner—David Porta
Assistant Examiner—Christine Sung
(74) Attorney, Agent, or Firm—Fitzpatrick, Cella, Harper & Scinto

(57) ABSTRACT

Electrochemical corrosion of a reflective layer provided in a scintillator panel is prevented. The scintillator panel includes a conductive base member for supporting a wavelength converter layer and a reflective layer for emitting light converted by a phosphor layer to the outside, in which an insulating layer is formed between the conductive base member and the reflective layer. Alternatively, the above problem is solved by a scintillator panel in which the full circumference including the base member surface side of the reflective layer, the wavelength converter layer side of the reflective layer, and end surfaces of the reflective layer is covered with an insulating layer or a protective film for the reflective layer and a radiation imaging device using such a scintillator panel.

16 Claims, 15 Drawing Sheets

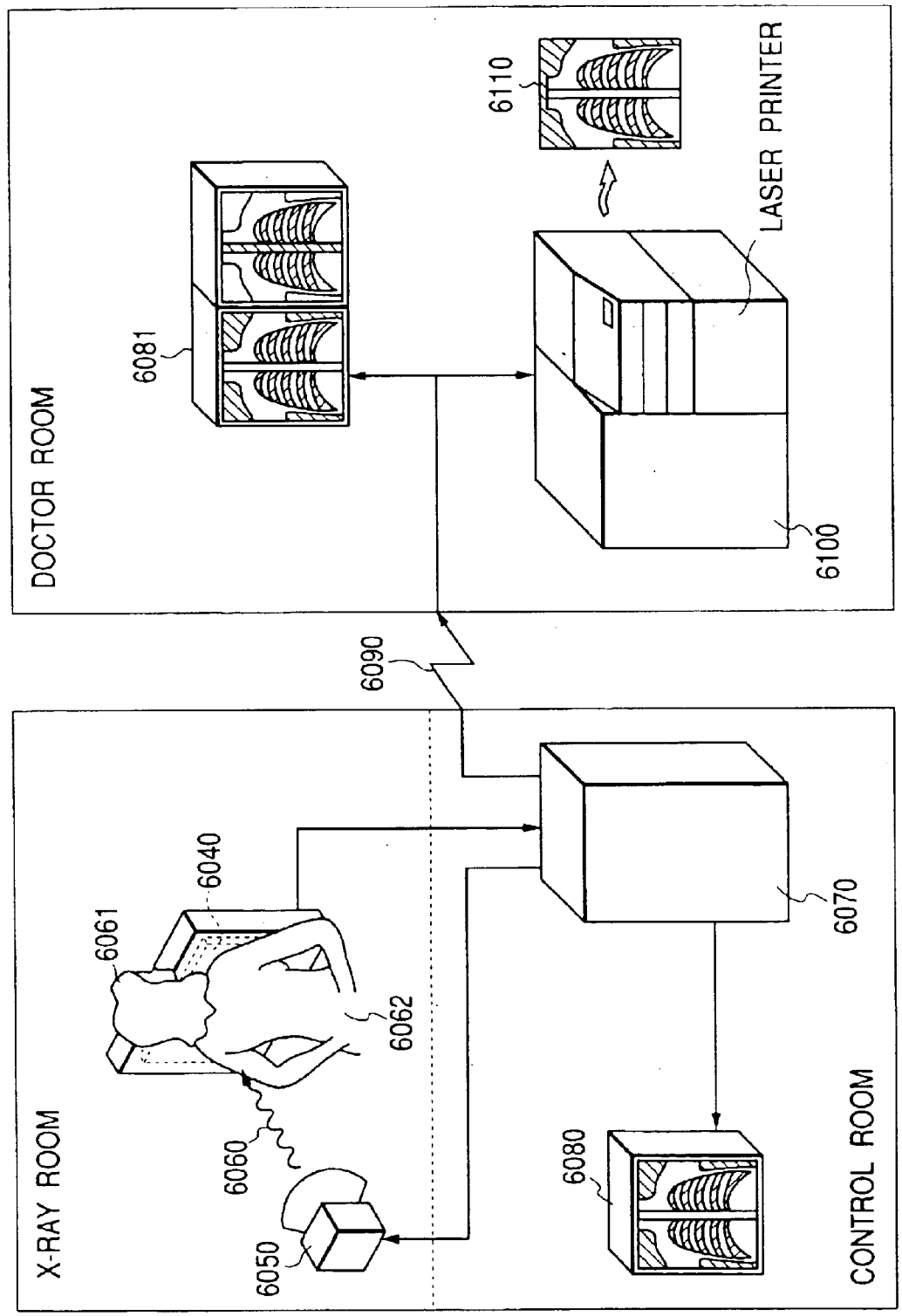

SCINTILLATOR PANEL, METHOD OF MANUFACTURING SCINTILLATOR PANEL, RADIATION DETECTION DEVICE, AND RADIATION DETECTION SYSTEM

BACKGROUND OF THE INVENTION

1. Field of the Invention

The present invention relates to a scintillator panel, a radiation detection device, and a radiation detection system, and more particularly a scintillator panel, a radiation detection device, and a radiation detection system for, for example, a medical X-ray imaging apparatus, an X-ray imaging apparatus for an industrial nondestructive test, or the like.

Note that, it is assumed in this specification that various electromagnetic waves such as an X-ray, an α-ray, a β-ray, and a γ-ray are included in a category of radiation and the description will be made on the basis thereof.

2. Related Background Art

Recently, digitization in the medical machine market is accelerated. Also, with respect to an X-ray image pickup system, a paradigm shift from a conventional film screen system to an X-ray digital radiography system is progressed.

Of X-ray detection devices for an X-ray image pickup having an X-ray digital radiography system, here is a device in which a sensor panel and a scintillator are adhered to each other through an adhesion layer made of a transparent adhesive. Note that the sensor panel includes a photoelectric conversion element portion having a photosensor using amorphous silicon and the like and a TFT. The scintillator includes a phosphor layer made of a fluorescent substance and a reflective film such as a metallic thin film for reflecting visible light emitted from the phosphor layer to the sensor panel side.

With respect to such an X-ray detection device, various elements can be combined according to a purpose without limiting an element structure of the sensor panel and a fluorescent substance material of the scintillator.

Next, an operation of the X-ray detection device will be described. First, when an X-ray enters the main body of the device, it is transmitted through the reflective layer and absorbed in the phosphor layer. After that, the phosphor layer emits visible light having an intensity corresponding to the absorbed X-ray. The visible light is converted into an electrical signal by the photosensor in the photoelectronic conversion element portion and outputted to the outside in accordance with switching of an on/off of the TFT. Thus, information of the input X-ray is converted into a two-dimensional digital image.

Here, various base members composing the scintillator are considered. However, it is preferable that amorphous carbon or the like is used because of the following reasons.

(1) Since the absorption of an X-ray is small as compared with glass and aluminum, a larger amount of X-rays can be emitted to the phosphor layer side. For example, in the case where respective materials are set to be practical thicknesses (OA-10 glass plate produced by Nippon Electric Glass Co., Ltd.: 0.7 mm, Al plate: 0.5 mm, and amorphous carbon plate: 1 mm), when photon energy is 60 keV or higher in any materials, transmittance of 90% or higher can be kept. However, transmittance is greatly reduced in the case of 60 keV or lower in the OA-10 glass plate and in the case of 35 keV or lower in the Al plate. On the other hand, although the amorphous carbon plate is thicker than other materials, transmittance of 95% or higher is kept in the case of 20 keV or higher. Thus, a nearly flat transmittance characteristic can be indicated within an energy region of an X-ray used in a medical field.

(2) Amorphous carbon has a superior medicine resistance. There is no case where amorphous carbon is eroded by strong acid such as hydrofluoric acid and a solvent.

(3) Amorphous carbon has a superior heat resistance. The amorphous carbon has a higher heat resistance than glass and aluminum.

(4) Amorphous carbon has a good conductive property. Since the amorphous carbon has a conductivity σ of $2.4 \times 10^{-2} \ \Omega^{-1} \ cm^{-1}$, it also serves as an electromagnetic shield and for preventing electrostatic discharge in manufacturing.

(5) Since the thermal expansion coefficient is close to that of glass, when amorphous carbon is bonded to a base member made of glass etc., a possibility of peeling and the like by a difference of an expansion coefficient after bonding is low. Although thermal expansion coefficient of generally used panel glass is $4.6 \times 10^{-6}$, that of amorphous carbon is close to this value and $2.0 \times 10^{-6}$.

Also, the reason why the reflective layer is used is as follows. That is, since the reflectance of amorphous carbon or the like to an air layer is about 20% and low, the reflective layer made from a metallic thin film is provided to improve light utilization efficiency. Various materials are considered for a material for the reflective layer. However, it is preferable that a metallic film made of aluminum etc. is used as a material for the reflective layer because of the following reasons.

(1) High reflectance is indicated approximately through the entire region of visible light. Note that detailed information is described in Journal of the Optical Society of America, Vol. 45, No. 11, p945, 1955.

(2) It is a low cost.

(3) A thin film formed by evaporation is easy to obtain a mirror surface and the occurrence of disturbance of resolving power due to diffuse reflection is less.

Also, a scintillator including these materials is concretely manufactured by the following method. First, a base member made of amorphous carbon or the like, whose surface is polished to be a mirror surface is washed and then an aluminum thin film is formed thereon by sputtering or the like. When the aluminum thin film is too thick, diffuse reflection is caused by uneven portions in the surface. On the other hand, when it is too thin, light is transmitted. Thus, the thickness is generally set to be 100 nm to 500 nm.

Next, a column-shaped phosphor layer is formed on the aluminum thin film by evaporation. A process temperature at this time exceeds 200° C. in many cases. After that, a protective layer is formed around the phosphor layer to complete a scintillator.

However, the following was cleared from our studies. That is, in the above-mentioned method, when alkali halide phosphor, for example, CsI is formed on a reflective layer which is formed in a conductive base member made of amorphous carbon or the like, corrosion of the reflective layer is started within several days. As this reason, it is considered that aluminum as a material for the reflective layer is corroded by halogen in CsI, that is, iodine.

As one method of preventing this corrosion, it is considered that a protective layer is provided in a front surface side of the reflective layer.

However, it is found that corrosion caused within a short time cannot be suppressed. Also, with respect to such a problem, it is found that the occurrence of corrosion is greatly suppressed in the case where glass is used as a material for the base member and aluminum is used as a material for the reflective layer.

Thus, it is considered that electrochemical corrosion caused in the case where a conductive material (such as a material including a carbon component, for example, amorphous carbon or a material including a silicon component) and a different kind of conductive material for a reflective film of metal such as aluminum are laminated is greatly related to another reason why the reflective layer is corroded.

Here, according to Japanese Patent Application Laid-open No. 53-122356, it is described that a phosphor made of cesium iodide is provided on the entire surface of a substrate through an aluminum evaporation film. However, from the same reason as above, electrochemical corrosion cannot be prevented by the technique described in this document.

Also, according to Japanese Patent Application Laid-open No. 10-160898, the structure using an insulator such as PET or glass as a base member is disclosed. However, since the base member itself is an insulator, electrochemical corrosion is not almost caused between the base member and a reflective layer.

As described above, the electrochemical corrosion of the reflective layer in the scintillator panel, that is, corrosions of the reflective layer and the phosphor layer due to reaction between the base member and the reflective layer becomes a problem to be solved in order to realize a scintillator panel having high reliability for a long period.

In addition, when a reflective film made of Al or the like is directly formed on a base member made of amorphous carbon or the like by evaporation, since the adhesion to the surface of the amorphous carbon is not preferable, there is a problem in that peeling is caused in an interface between the base member and the reflective layer. There may be the case where this also becomes a problem when realizing a scintillator panel having high reliability.

SUMMARY OF THE INVENTION

In order to solve at least one of the above-mentioned problems, the present invention relates to a scintillator panel including a conductive base member for supporting a wavelength converter and a reflective layer for reflecting light converted by the phosphor layer and outside light radiated from outside, characterized in that an insulating layer is formed between the conductive base member and the reflective layer.

Also, according to the present invention, a radiation detection device including a scintillator panel is characterized by comprising a photoelectric conversion element for converting light emitted from the scintillator panel side into an electrical signal and a wiring portion for transmitting the electrical signal converted by the photoelectric conversion element.

Further, according to the present invention, a method of manufacturing a scintillator panel including a conductive base member for supporting a phosphor layer and a reflective layer for emitting light converted by the phosphor layer to an outside, is characterized by comprising a step of forming an insulating layer having a heat resistance to a temperature at deposition of the phosphor layer, between the conductive base member and the reflective layer.

Further, a radiation detection system according to the present invention, is characterized by comprising the radiation detection device, signal processing means for processing a signal from the radiation detection device, recording means for recording the signal from the signal processing means, display means for displaying the signal from the signal processing means, transmission processing means for transmitting the signal from the signal processing means, and a radiation generating source for generating the radiation.

Also, a scintillator panel including a base member for supporting a wavelength converter layer and a reflective layer for reflecting light converted by the wavelength converter layer to the opposite side of the base member, is characterized in that a full circumference including a base member surface side of the reflective layer, the phosphor layer side, and end surfaces is covered with one of an insulating layer and a protective film for the reflective layer.

BRIEF DESCRIPTION OF THE DRAWINGS

FIG. 20 is a block diagram indicating a schematic structure of an X-ray diagnostic system of Embodiment 11.

DETAILED DESCRIPTION OF THE PREFERRED EMBODIMENTS

Figure 1:
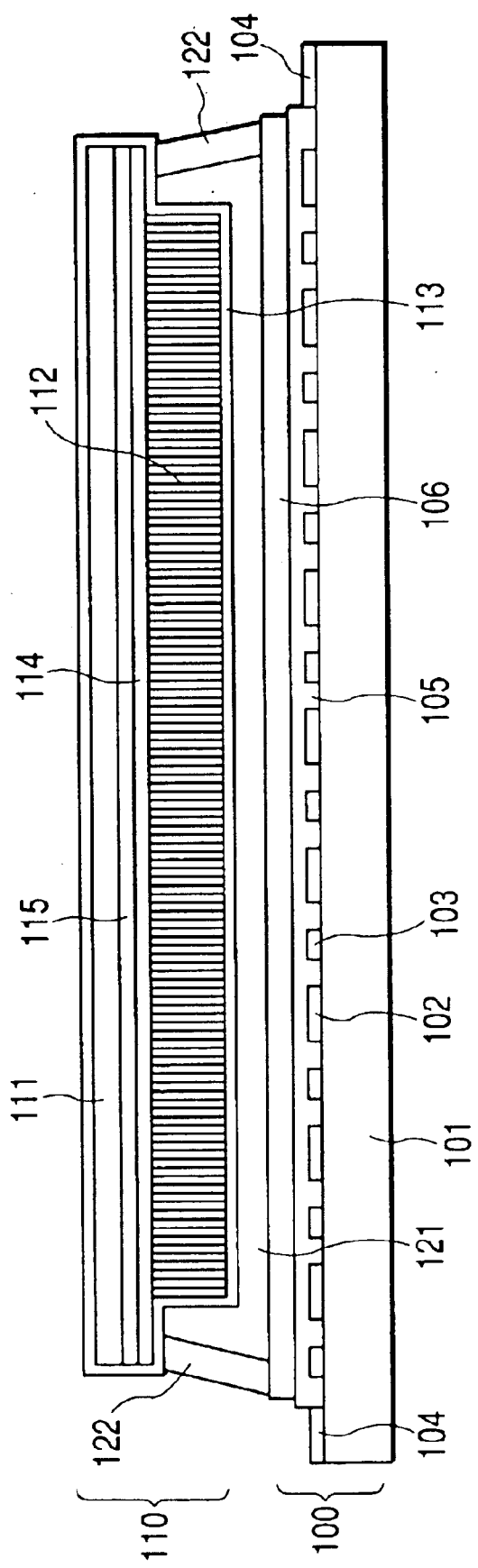
FIG. 1 is a schematic cross sectional view of a radiation detection device of Embodiment 1 of the present invention.

Hereinafter, embodiments of the present invention will be described using the drawings.

A scintillator panel of the present invention includes a conductive base member, a conductive reflective layer made of aluminum or the like, and an insulating layer for preventing corrosion due to contact between the base member and the reflective layer, which is located therebetween.

It is preferable that this insulating layer has a heat resistance in the case where it becomes a high temperature state at the time of formation processes of the reflective layer, a phosphor, and the like.

As a conductive material, a material including a carbon component is used, in particular, amorphous carbon is preferably used.

When the insulating layer is made so as to be resistant to heat, for example, at 200° C. or higher, it is resistant to heat to be applied in the case where the reflective layer and a phosphor layer are formed. Note that the phosphor layer is used as a wavelength converter for converting radiation into light and is a column-shaped crystalline phosphor or the like made of alkali halide. In particular, when alkali halide is used for the phosphor layer, it is necessary to perform annealing processing at a higher temperature than that at the time of evaporation in order to activate an activator such as Tl. Thus, in such a case, the insulating layer is particularly preferable.

The insulating layer may be a single layer or a multilayer. However, it is preferable that a volume resistivity of the insulating layer corresponding to a contact portion with at least the reflective layer is $1 \times 10^{10}$ Ωcm or more. A region having a volume resistivity of about $1 \times 10^8$ Ωcm or less is a region of semiconductor. In the case of this region, there is a possibility that the resistivity is changed due to a change in a state, for example, an, increase in a temperature and it is difficult to obtain perfect insulation. Thus, the above volume resistivity is set as a value including a margin. Incidentally, the volume resistivity of single silicon in semiconductor is $3 \times 10^5$ Ωcm and that of GaAs is $7 \times 10^7$ Ωcm.

When a silicon compound is formed, an optical band gap becomes larger and it becomes an insulator having a volume resistivity of $1 \times 10^{10}$ Ωcm or more. Incidentally, SiOx, SiNx, and the like each are a material in which the optical band gap and the volume resistivity are satisfied. Further, it is known that such a silicon compound is easy to make chemical bonding to carbon and SiC and the like are very hard materials.

In the semiconductor field, Al and an Al alloy thin film are generally used as wiring materials. With respect to the adhesion to a silicon compound, there is a track record in a semiconductor device. On the other hand, tetraalkylsilane (Si—OR, R=$CH_3$, $C_2H_5$, $C_3H_7$) obtained by plasma polymerization has an insulation property of $1 \times 10^{10}$ Ωcm or more and actually used as a coupling layer which includes mainly carbon and is made of an organic material and metal. This material is formed by plasma polymerization and has a heat resistance such that it is resistant to heat at 200° C. or higher if the number of carbon in alkyl group is about 1 to 3. In other words, a material including silicon serves as an insulating heat resistant layer between the conductive base member and the reflective layer and has good adhesion. Thus, such a material is preferable.

A metallic oxide film is made of a stable insulating substance. Thus, most films have a volume resistivity of $1 \times 10^{10}$ Ωcm or more and a heat resistance such that it is resistant to heat at 200° C. or higher. Incidentally, $Al_2O_3$, $SiO_2$, $TiO_2$, MgO, BeO, CeO, $HfO_2$, $ThO_2$, $UO_2$, $ZrO_2$, or the like can be concretely used. Note that, when a composition ratio is changed, there is a material indicating semiconductor transition. Thus, it is necessary to prevent a change in a composition ratio.

Also, polyimide, a divinylsiloxanebisbenzobutene based resin, a methylxylsesquioxane based resin, polyamideimide, polyethersulfone, polyetherimide, aromatic polyester, and the like each are an insulating material having a volume resistivity of $1 \times 10^{10}$ Ωcm or more and a heat resistance such that it is resistant to heat at 200° C. or higher. When these heat resistive resins are used, since the film thickness can be increased as compared with the case where a material including silicon is used, insulation breakdown due to rough of a base, a contamination or a pin hole can be further reduced. Thus, these resins are preferable.

Incidentally, when a material including silicon is used, it cannot be made too thick because of the influence of internal stress thereof. Thus, it is suitable that the thickness is generally set to be several tens of nm to several hundreds of nm. However, in the case of the heat resistant resin, the thickness can be controlled in a range of several hundreds of nm to several ten thousands of nm. Further, since these resins include carbon, the adhesion to carbon is suitable. When a base is made rough such that a difference between concave and convex is 0.02 μm or more to provide an anchor effect, the adhesion power can be further improved.

Also, when the film thickness of the resin is increased, the surface thereof can be planarized. Thus, evenness of reflective layer is ensured and the mirror surface can be kept. In addition, the adhesion to the reflective layer is improved. Thus, this is preferable. Also, continuity between the reflective layer and the base member through a pin hole can be further prevented. Note that, when the difference between concave and convex exceeds 5 μm, the above planarization effect is reduced. Thus, it is preferable that the difference is within a range of 0.02 μm to 5 μm. With respect to adhesion to Al, there is also a weak combination. However, when some surface treatment, for example, inverse sputtering is performed before Al film formation, the adhesion power can be further improved.

The material including silicon, the metallic oxide film, and the heat resistant resin have high adhesion power. However, in order to provide a further effect, a plurality of materials selected from these materials may be laminated. In this case, an insulation property with $1 \times 10^{10}$ Ωcm or more is preferably provided for a layer which is in contact with at least a metallic thin film irrespective of a resistivity of a layer located thereunder.

Also, a material having the highest adhesion possible to amorphous carbon is preferably selected for a contact layer which is in contact with amorphous carbon and a material having the highest adhesion possible to Al is preferably selected for a contact layer which is in contact with Al. If the adhesion between the laminated layers is deteriorated, it is preferable that a composition is gradually changed.

Hereinafter, embodiments of the present invention will be described in detail with reference to the drawings.

(Embodiment 1)

FIG. 1 is a schematic cross sectional view of a radiation detection device of this embodiment. In FIG. 1, reference numeral 110 denotes a scintillator. This scintillator includes a phosphor 112 which is used as a wavelength converter for converting radiation into light, made of alkali halide, and crystallized in a column shape, a base member 111 made of amorphous carbon or the like for supporting the phosphor 112, a reflective layer 114 made from an aluminum thin film for reflecting light converted by the phosphor 112 to a sensor panel 100 side described later, an insulating film 115 which is formed between the base member 111 and the reflective layer 114 and made of SiNx or the like, and a protective layer 113 made of an organic resin for protecting the phosphor 112 and the like from outside air. This reflective layer also serves to prevent entrance of scattering light such as outside light into a sensor.

Since strong bond is produced between silicon in SiNx and carbon in amorphous carbon, adhesion power is high. Further, adhesion between a thin film including silicon etc. and aluminum becomes adhesion between SiNx and an aluminum thin film. Thus, a high adhesion power state can be produced as a track record in semiconductor.

Since SiNx has an insulation property and a heat resistance, the amorphous carbon base member 111 and the aluminum thin film (reflective layer) 114 are electrically insulated from each other.

Also, in FIG. 1, reference numeral 100 denotes a sensor panel. This sensor panel includes a glass substrate 101, a photoelectric conversion element portion 102 composed of a photosensor and a TFT using amorphous silicon respectively, a wiring portion 103 for transmitting an electrical signal converted by the photoelectric conversion element portion 102, an electrode contact layer (portion) 104 for leading the electrical signal transmitted through the wiring portion 103 to the outside, a first protective layer 105 made of silicon nitride or the like, and a second protective layer 106 made of polyimide or the like.

The sensor panel 100 and the scintillator 110 are bonded to each other by an adhesive 121 and the surroundings are sealed with a sealing member 122. Note that the photoelectric conversion element portion 102 can preferably detect visible light from the phosphor 112. Thus, an MIS type sensor made of amorphous silicon or the like or a PIN type sensor may be used. Also, a TFT or a PIN type diode may be used as a switch. Further, a CMOS sensor or a CCD imaging element may be used. In this case, the substrate 101 made of crystal silicon is used.

Also, tiling may be made using plural units of the radiation detection device shown in FIG. 1 according to applications. Further, with respect to the scintillator panel 110, the example in the case where the base member 111, the insulating layer 115, the reflective layer 114, and the phosphor 112 are laminated from the top of FIG. 1 in this order is indicated. However, the reflective layer 114, the insulating layer 115, the base member 111, and the phosphor 112 may be laminated in this order.

Figure 2A:
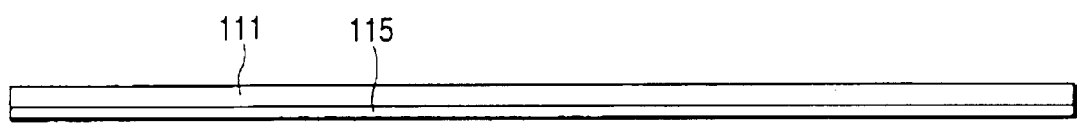
FIGS. 2A and 2B show steps of manufacturing the radiation detection device shown in FIG. 1.
Figure 2B:
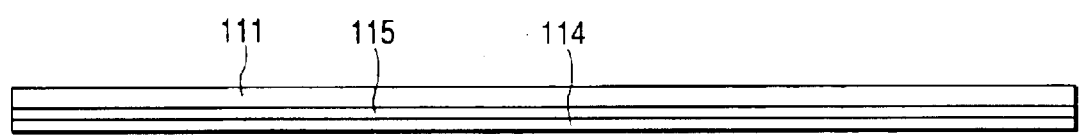

FIGS. 2A and 2B show steps of manufacturing the radiation detection device shown in FIG. 1. The base member 111 which is polished to obtain a mirror surface and made of amorphous carbon or the like is washed and dried once, and then an SiNx thin film as the insulating layer 115 is formed thereon to have a thickness of about 300 nm by sputtering or the like (FIG. 2A). The insulating layer 115 can also be formed by CVD (chemical vapor deposition).

Next, an aluminum thin film is formed as the reflective layer 114 on the insulating film 115 with a thickness of about 300 nm by sputtering (FIG. 2B). As a film formation method of the reflective layer 114, a vacuum evaporation method, an electron beam (EB) method, or the like can also be used. When the insulating layer 115 and the reflective layer 114 are formed in succession by the same film formation apparatus, a failure due to the influence of a contamination and the like can be prevented as compared with the case where a member (substrate) is taken out from a film formation chamber in each film formation. Thus, such formation is desirable.

Next, a phosphor made of alkali halide is formed as the phosphor 112 on the reflective layer 114 at a temperature of 200° C. or higher, and then the whole is covered with a protective layer 113. Thus, the scintillator 110 shown in FIG. 1 can be completed. It is desirable that a CVD film made of parylene or the like which is generally used and has a high moisture resistance is used as the protective layer 113.

In this embodiment, the example in the case where SiNx is used for the insulating layer 115 is indicated. In addition to SiNx, a silicon compound such as SiOx, an insulating layer including mainly a silicon such as tetraalkylsilane (Si—OR, R=$CH_3$, $C_2H_5$, $C_3H_7$), or a metallic oxide film may be used. When a silicon compound is used for the insulating layer 115, it is preferable that the film thickness is maximized. However, when the film is made too thick, there is the case where peeling due to internal stress is caused. Thus, the film thickness is preferably several tens of nm to several hundreds of nm.

Also, in this embodiment, the example in the case where the aluminum thin film is used as the reflective layer 114 is indicated. However, another metallic layer made of an aluminum alloy, silver, a silver alloy, copper, gold, or the like may be used in accordance with a wavelength of light emitted from the phosphor.

Next, an operation of the radiation detection device shown in FIG. 1 will be described. When radiation is entered from the top portion of FIG. 1, it is transmitted through the base member 111, the insulating layer 115, and the reflective layer 114 and absorbed by the phosphor 112. The phosphor 112 emits visible light at the amount of light corresponding to the intensity of the absorbed radiation.

The visible light is converted into an electrical signal by the photoelectrical conversion element portion 102 and outputted to the wiring 103 in accordance with ON/OFF switching of a TFT. The electrical signal outputted to each wiring 103 is led to the outside through the electrode contact layer (portion) 104. In the outside, processing for obtaining a two-dimensional digital image to be displayed on a display portion is performed by a processing apparatus not shown. Thus, information of radiation made incident on the radiation detection device can be converted to obtain a two-dimensional digital image in the outside.

As described in this embodiment, when amorphous carbons is used for the base member, and a different conductive material is used for the reflective layer, since corrosion is rapidly progressed, the structure of this embodiment is preferably used.

(Embodiment 2)

Figure 3:
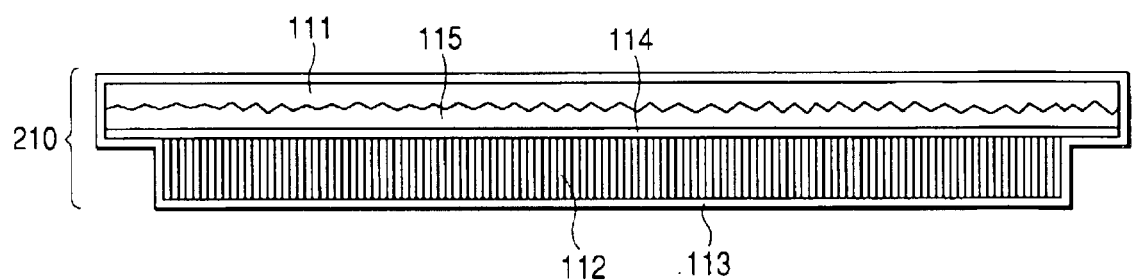
FIG. 3 is a cross sectional view of a scintillator according to a radiation detection device of Embodiment 2 of the present invention.

FIG. 3 is a cross sectional view of a scintillator 210 according to a radiation detection device of this embodiment. In this embodiment, polyimide is used for an insulating layer 115. Also, the surface of a base member 111 is made rough such that the adhesion to the insulating layer 115 is improved. Thus, the adhesion power due to an anchor effect is obtained between the insulating layer 115 and the base member 111. It may not be made rough in accordance with a state of the surface of the base member to be used.

Note that the same reference symbols are used for the same portions as FIG. 1 in FIG. 3. Also, with respect to a sensor panel 100, the same one as FIG. 1 is preferably used.

The base member 111 is not flat surface. However, when the insulating layer 115 is provided to make the surface of the insulating film flat, a reflective layer 114 can be formed to be flat and the surface of the reflective layer 114 can be made to obtain mirror reflection. For further planarization, the insulating layer 115 is preferably formed such that the film thickness is sufficiently larger than roughness on the surface of the base member 111. A preferable thickness is about 1 μm to 20 μm. Thus, a thickness of polyimide in this embodiment can be increased and it is particularly preferable.

Further, when processing such as inverse sputtering is performed before film formation of the reflective layer 114, necessary adhesion power between the insulating layer 115 and the reflective layer 114 can be ensured. Of course, since a polyimide is an insulating material having a heat resistance, the conductive base member and the reflective layer can be electrically insulated from each other.

Figure 4A:
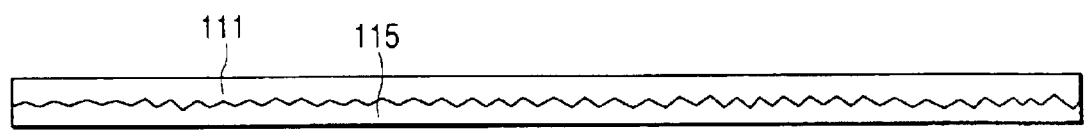
FIGS. 4A and 4B show steps of manufacturing the scintillator shown in FIG. 3.
Figure 4B:
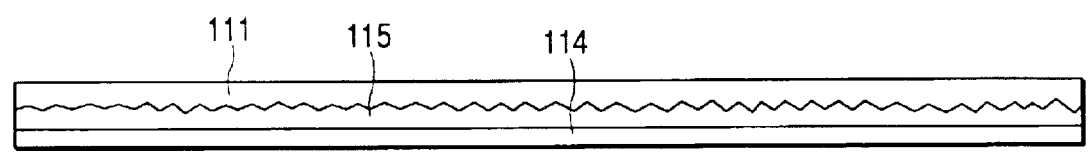

FIGS. 4A and 4B show steps of manufacturing the scintillator shown in FIG. 3. With a state that the surface becomes desired roughness, the base member 111 is washed and dried once, and then polyimide for the insulating layer 115 is applied thereon to have a thickness of about several μm by spin coating or the like and cured (FIG. 4A). The application of the insulating layer 115 can also be made from a nozzle provided with a slit by a jet method or a spray method.

Next, an aluminum thin film is formed as the reflective layer 114 on the insulating layer 115 to have a thickness of about 300 nm by sputtering or the like (FIG. 4B). When the reflective layer 114 is formed, in order to further improve the adhesion to polyimide for the insulating layer 115, surface treatment such as inverse sputtering may be performed immediately before the film formation. As a film formation method of the reflective layer 114, a vacuum evaporation method, an EB method, or the like can be also used.

Next, a phosphor made of alkali halide is formed as the phosphor 112 on the reflective layer 114 at a temperature of 200° C. or higher, and then the whole is covered with the protective layer 113. Thus, the scintillator 210 shown in FIG. 3 can be completed.

In this embodiment, the example in the case where polyimide is used for the insulating layer 115 is indicated. In addition to this, a divinylsiloxanebisbenzobutene based resin, a methylxylsesquioxane based resin, polyamideimide, polyethersulfone, polyetherimide, aromatic polyester, and the like may be used. Further, when a resin has good adhesion to a material used for the base member 111, it is not necessary to make the base member rough.

With respect to the scintillator 210 of this embodiment, the insulating layer 115 can be formed to be thick (several μm to 20 μm). Thus, there is an advantage in that it becomes a strong structure to insulation breakdown due to a foreign object and the like. Also, since it is not required that the base member 111 is polished to obtain a mirror surface, there is an advantage in that a cost is reduced by that content.

(Embodiment 3)

Figure 5:
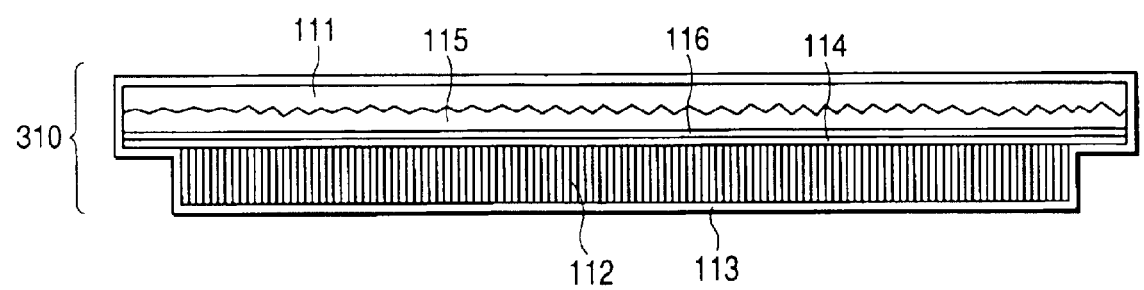
FIG. 5 is a cross sectional view of a scintillator according to a radiation detection device of Embodiment 3 of the present invention.

FIG. 5 is a cross sectional view of a scintillator 310 according to a radiation detection device of Embodiment 3 of the present invention. In this embodiment, a divinylsiloxanebisbenzobutene based resin (hereinafter referred to as a "BCB") is used for an insulating layer 115. Also, a second insulating layer 116 made of SiNx or the like is provided between the insulating layer 115 and a reflective layer 114. Note that the same reference symbols are used for the same portions as FIG. 3 in FIG. 5. Also, with respect to a sensor panel 100, the same one as FIG. 1 is used.

With respect to the scintillator 310 shown in FIG. 5, as in the case of the scintillator shown in FIG. 3, the surface of a base member 111 is made rough to improve the adhesion to the insulating layer 115 and the surface of the insulating layer 115 is also flat. The film thickness of the insulating layer 115 is preferably determined as in the case of FIG. 3 and a preferable thickness is about 1 μm to 10 μm.

It is said that a degree of adhesion between SiNx or the like and a BCB is high in a semiconductor field. Thus, when SiNx or the like is used for the second insulating layer 116, the bond to the BCB as a material of the insulating layer 115 can be made strong. Further, since SiNx is a material having a high moisture resistance, it also serves as a moisture resistant layer. Since both the BCB and SiNx are insulating materials, electrical insulation between the conductive base member and the reflective layer is also ensured. Since both materials have a heat resistance such that it is resistant to heat at 200° C. or higher, it is not difficult to manufacture the radiation detection device.

Figure 6A:
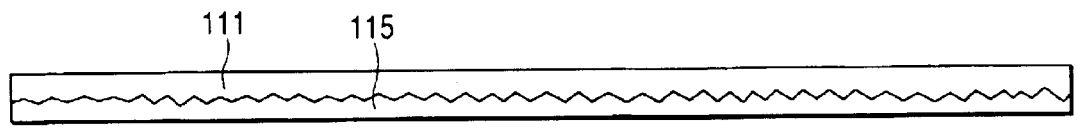
FIGS. 6A, 6B and 6C show steps of manufacturing the radiation detection device shown in FIG. 5.
Figure 6B:
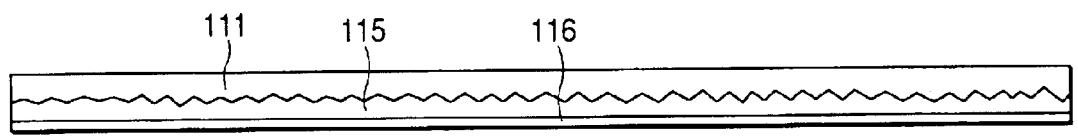
Figure 6C:
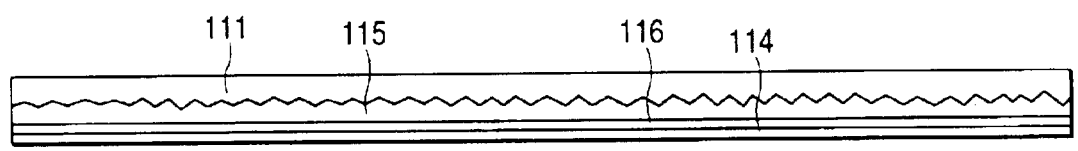

FIGS. 6A to 6C show steps of manufacturing the radiation detection device shown in FIG. 5. The base member 111 made of amorphous carbon or the like, which surface is made rough to same extent is washed and dried once, and then the BCB for the insulating layer 115 is applied thereon to have a thickness of about several μm by spin coating or the like and cured (FIG. 6A). The application of the insulating layer 115 can also be made from a nozzle provided with a slit by a jet method or a spray method.

Next, SiNx is formed for the second insulating layer 116 on the insulating layer 115 by sputtering or the like (FIG. 6B). The SiNx may be formed by CVD.

Next, the reflective layer 114 is formed on the second insulating layer 116 to have a thickness of about 300 nm by sputtering or the like (FIG. 6C). When the reflective layer 114 is formed, in order to further improve the adhesion to SiNx for the second insulating layer 116, surface treatment such as inverse sputtering is preferably performed immediately before the film formation. As a film formation method of the reflective layer 114, a vacuum evaporation method, an EB method, or the like can be also used.

Next, a phosphor made of alkali halide is formed as the phosphor 112 on the reflective layer 114 at a temperature of 200° C. or higher, and then the whole is covered with a protective layer 113. Thus, the scintillator 310 shown in FIG. 5 can be completed.

In this embodiment, various materials described above can be used for the insulating layer 115. Further, when a material has good adhesion to a material of the base member 111, it is not necessary to make the surface of the base member 111 rough.

Also, in this embodiment, the example in the case where SiNx is used for the second insulating layer 116 is described. However, in addition to this, a silicon system insulating film made of SiOx or the like or a metallic oxide film may be used.

When the second insulating layer 116 is formed, a moisture resistance in the scintillator 310 shown in FIG. 5 can be further improved as compared with the scintillator shown in FIG. 3.

(Embodiment 4)

Figure 7:
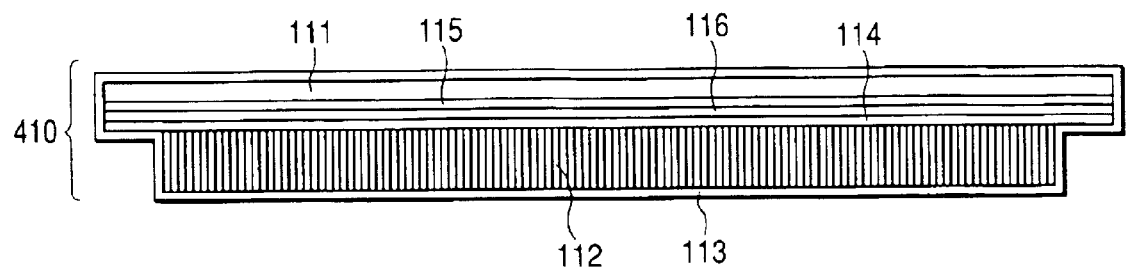
FIG. 7 is a schematic cross sectional view of a scintillator according to a radiation detection device of Embodiment 4 of the present invention.

FIG. 7 is a schematic cross sectional view of a scintillator 410 according to a radiation detection device of this embodiment. In this embodiment, respective silicon system materials are used for an insulating layer 115 and a second insulating layer 116. An SiCx film having Si—C bonding, which is capable of reducing a structure disturbance in the case of the bond to amorphous carbon is used as the insulating layer 115. Also, an SiOx film having good adhesion to the reflective layer 114 is used as the second insulating layer 116. Note that the same reference symbols are used for the same portions as FIG. 3 in FIG. 7. Also, with respect to a sensor panel 100, the same one as FIG. 1 is used.

With respect to the scintillator 410 shown in FIG. 7, as in the case of the scintillator shown in FIG. 1, the surface of the base member 111 is processed to be a mirror surface. As described above, SiCx having Si—C bonding is used for the insulating layer 115. Thus, the adhesion power to the base member 111 can be increased. Also, since both SiOx and SiCx are silicon system materials, the adhesion power between the second insulating layer 116 and the insulating layer 115 is inherently high. Further, since a structure of SiOx and aluminum has a track record in a semiconductor field, a superior degree of adhesion is obtained. Furthermore, when a composition of SiCx and SiOx is gradually changed, an interlayer interface can be eliminated and the adhesion power can be further improved.

Note that, since a volume resistivity of SiC is smaller, such as $1 \times 10^{-4}$ Ωcm, two layers of SiC and SiO2 are constructed using SiO2 having an insulation property and function as the insulating layer. Thus, the first insulating layer and the second insulating layer can be functionally separated to use them.

Note that, even in the case of this embodiment, as in Embodiment 1 and the like, an aluminum ally, silver, a silver alloy, copper, or gold can be also used for the reflective layer 114 in addition to an aluminum thin film. With respect to the second insulating layer 116, a material may be changed in consideration of the degree of adhesion and the like according to a material of the reflective layer 114.

Figure 8A:
FIGS. 8A, 8B and 8C show steps of manufacturing the radiation detection device shown in FIG. 7.
Figure 8B:
Figure 8C:
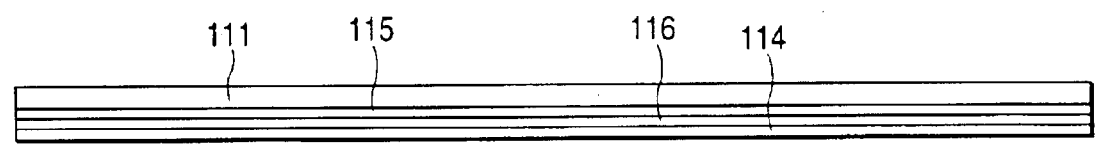

FIGS. 8A to 8C show steps of manufacturing the radiation detection device shown in FIG. 7. The conductive base member 111 made of amorphous carbon or the like, whose surface is processed to be a mirror surface is washed and dried once, and then SiCx for the insulating layer 115 is formed thereon by plasma decomposition while flowing a gas of SiH4+CH4 by a CVD method or the like (FIG. 8A).

Next, SiOx for the second insulating film 116 is formed on the insulating layer 115 while flowing a gas of SiH$_4$+H$_2$O by a CVD method or the like (FIG. 8B). In order to further improve the adhesion power between the insulating layer 115 and the second insulating layer 116, a gas composition may be gradually changed from SiH$_4$+CH$_4$ to SiH$_4$+H$_2$O while keeping discharge.

Next, an aluminum thin film is formed as the reflective layer 114 on SiOx to have a thickness of about 300 nm by a method such as sputtering (FIG. 8C). When the reflective layer 114 is formed, in order to further improve the adhesion to SiOx as a material of the second insulating layer 116, surface treatment such as inverse sputtering is preferably performed immediately before the film formation. As a film formation method of the reflective layer 114, a vacuum evaporation method, an EB method, or the like can be also used.

Next, a phosphor made of alkali halide is formed as the phosphor 112 on the reflective layer 114 and then the whole is covered with a protective layer 113. Thus, the scintillator 410 shown in FIG. 7 can be completed.

In this embodiment, a material having good adhesion to a material of the base member 111 as a base is selected for the insulating layer 115. Also, a material having good adhesion to a material of the reflective layer 114 as an upper layer is selected for the second insulating layer 116. Thus, the adhesion power is improved.

Further, in this embodiment, a composition of the insulating layer 115 and the second insulating layer 116 may be gradually changed to realize stronger adhesion power.
(Embodiment 5)

Figure 9:
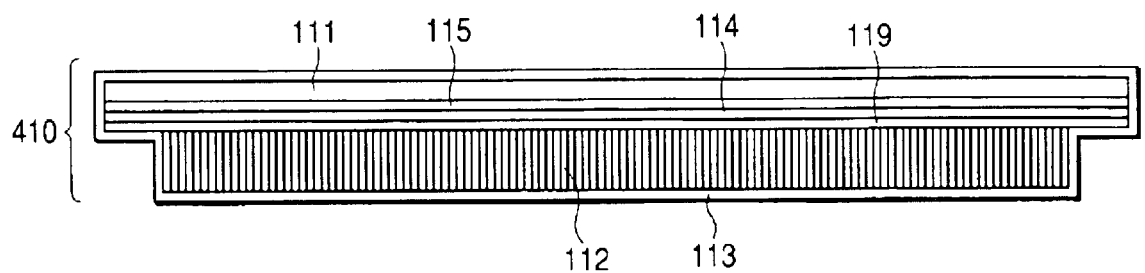
FIG. 9 is a schematic cross sectional view of a scintillator according to a radiation detection device of Embodiment 5 of the present invention.

FIG. 9 is a schematic cross sectional view of a scintillator panel according to a radiation detection device of this embodiment. According to a structure of this embodiment, a protective film 119 for a reflective layer is provided between a reflective layer and a wavelength converter layer. When such a structure is used, corrosions to the reflective layer can be suppressed. As the protective layer for the reflective layer, SiO$_2$, SiNx, or the like may be used or an organic substance such as polyimide may be used.

Table 1 indicates a result of a corrosion test with respect to the presence or absence of a first insulating layer and a second insulating layer. Note that the first insulating layer is provided between a reflective layer and a base member and the second insulating layer is provided between the reflective layer and a phosphor layer. Actually, an immersion test using an aqueous solution of CsI (2 normalities) is performed.

TABLE 1

| No. | Second insulating layer | Reflective layer | First insulating layer | Base member | Evaluation |
|---|---|---|---|---|---|
| 1 | Absent | A1 | Absent | a-C | x |
| 2 | Exist (SiO$_2$) | A1 | Absent | a-C | Δ |
| 3 | Absent | A1 | Exist (polyimide) | a-C | ○ |
| 4 | Exist (polyimide) | A1 | Exist (polyimide) | a-C | ◎ |

Note
x denotes BAD,
Δ denotes UNSATISFACTORY,
○ denotes GOOD, and
◎ denotes EXCELLENT As indicated in Table 1, when the protective layer for the reflective layer is provided, it is clear that the prevention of corrosion is further improved.

With respect to Embodiments 1 to 5, when end portions of the base member is processed by beveling, since the insulating layer can be provided for the entire base member, it is preferable. Also, beveling of the base member will be described in detail in embodiments described below.
(Embodiment 6)

In the case of a scintillator panel according to a radiation detection device of this embodiment, a forming region of an insulating layer provided between a base member and a reflective layer is made larger than a forming region of the reflective layer. With this structure, electrochemical corrosion can be further prevented and durability to temperature and humidity can be further increased.

Figure 10A:
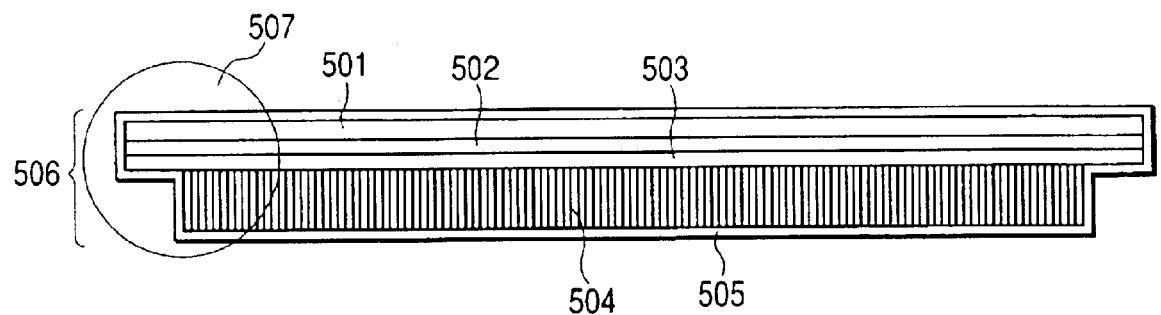
FIGS. 10A and 10B are schematic cross sectional views for explaining a scintillator panel in which the end surfaces of a reflective layer are aligned with those of the insulating layer.
Figure 10B:
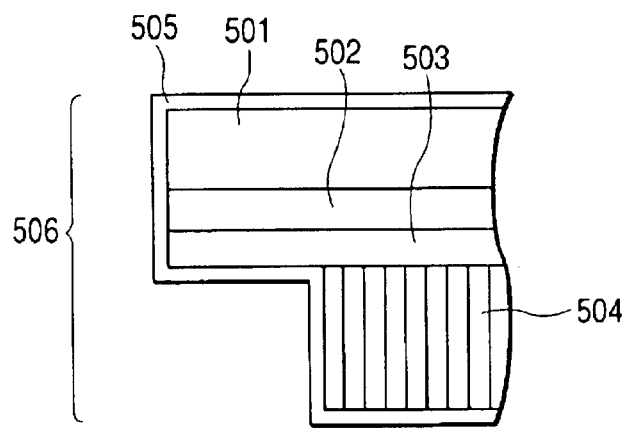

FIGS. 10A and 10B are schematic views of the following structure. That is, an insulating layer 502, a reflective layer 503, and a phosphor layer 504 are laminated on a conductive base member 501 and the full circumference is finally protected with a protective layer 505 so that the forming region of the insulating layer is nearly equal to the forming region of the reflective layer and end portions of the reflective layer are aligned with end portions of the insulating layer.

In the case of such a structure, when a durability test to temperature and humidity is performed at a temperature of 70° C. and 90%, the occurrence of electrochemical corrosion is appeared in a portion at possibility of about 10% (one item of 10 items) for 1000 hours.

The following is considered as the reason for which corrosion is caused in a portion. Note that FIG. 10A is a cross sectional view of a scintillator panel and FIG. 10B is a magnified view of an end portion of the scintillator panel shown in FIG. 10A.

(1) Wraparound of the Reflective Layer

Figure 11A:
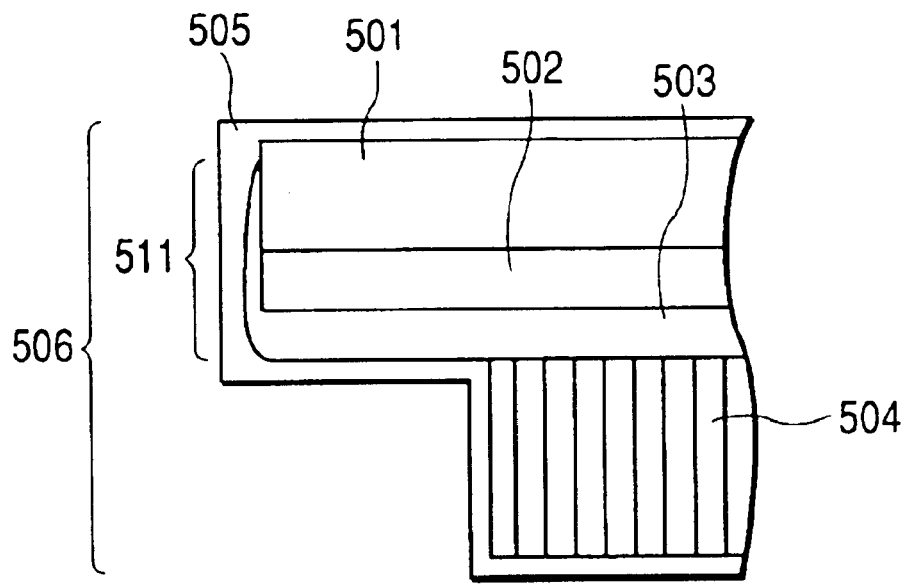
FIG. 11A is a schematic cross sectional view for explaining wraparound of the reflective layer and FIG. 11B is a schematic cross sectional view for explaining continuity through moisture.

FIG. 11A is a schematic cross sectional view for explaining wraparound of the reflective layer and shows a structure of the insulating layer 502 and the reflective layer 503. The insulating layer 502 is provided to insulate the metallic reflective layer 503 from the conductive base member 501 and electrochemical corrosion of the reflective layer 503 is prevented by this insulation. However, there is the case where metallic reflective layer particles released from a target are moved to end surfaces and rear surfaces of the base member 501 and the insulating layer 502 so as to wrap around them at sputtering used for forming the metallic reflective layer 503.

In such a case, as shown in FIG. 11A, metallic particles and the like used in the reflective layer 503 are moved to end surfaces 511 of the base member 501 and the insulating layer 502 so as to wrap around them. Thus, there is a fear that continuity between the base member 501 and the reflective layer 503 is produced. Therefore, there is a fear that electrochemical corrosion is caused by the continuity in the end portions 511 of the base member.

(2) Continuity through Moisture

Figure 11B:
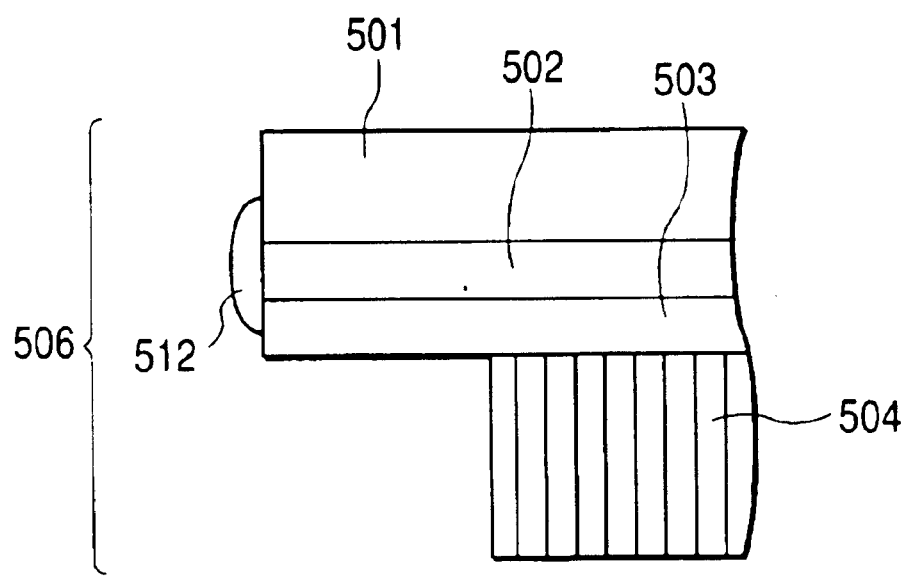

FIG. 11B is a schematic cross sectional view for explaining continuity through moisture. After the base member 501, the insulating layer 502, and the reflective layer 503 are laminated, when the phosphor layer 504 is formed or when the protective layer for the reflective layer is formed, there is the case where washing is performed. This is because, when the phosphor layer 504 is formed on a foreign object, the amount of light to be emitted in that region is decreased. When the protective layer for the reflective layer is formed on a foreign object, there is the case where washing is performed because of the same reason as in the case of the phosphor layer 504.

When moisture 512 is adhered to the end portions of the base member 501 during washing, continuity between the reflective layer 503 and the base member 501 is produced and there is the case where this becomes the reason for electrochemical corrosion.

Also, when moisture is adhered as described above, there is a fear that moisture is adhered to the end portions through the protective film at a durability test to temperature and humidity and electrochemical corrosion is promoted.

(3) Adhesion Power of the Reflective layer

Figure 12A:
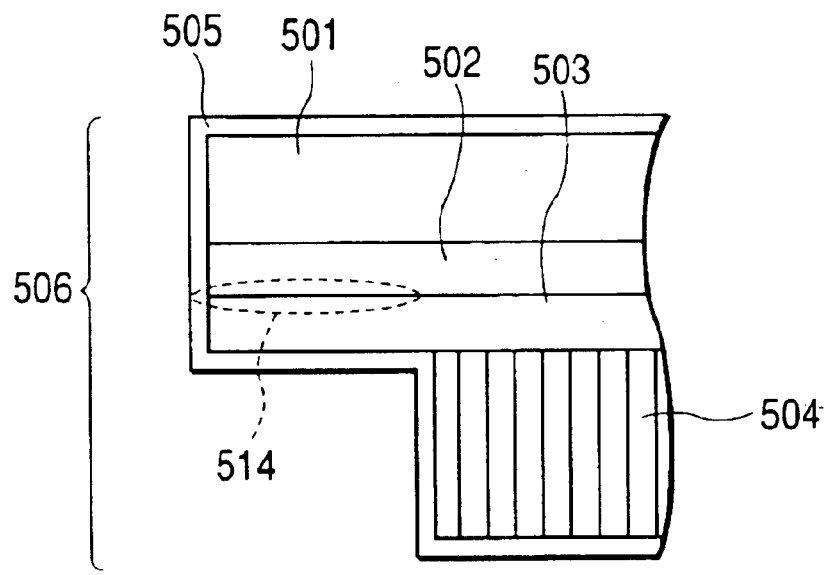
FIG. 12A is a schematic cross sectional view for explaining adhesion power of the reflective layer and FIG. 12B is a schematic cross sectional view for explaining a leak by a surface current.

FIG. 12A is a schematic cross sectional view for explaining adhesion power of the reflective layer. When the reflective layer 503 is formed on a large area, the adhesion power of the reflective layer 503 to the insulating layer 502 is decreased from the center toward the end surface (end portion 514 in the drawing). It is generally considered that this is because a distance between the base member 501 (insulating layer 502) and the target is shortest in the central portion of the base member 501 (insulating layer 502) and longest in the end portion of the base member 501 (insulating layer 502) at formation of the reflective layer by sputtering (in the case where it is considered that a size of the target is smaller than the base member 501 and the insulating layer 502). Thus, since the adhesion power between the insulating layer 502 and the reflective layer 503 in the end portion 514 is weak, there is the case where peeling is cased therebetween and there is the case where peeling is progressed from the end portion 514 as an initial point toward the inner portion. Therefore, there is a fear that corrosion is caused and a preferable reflection effect cannot be obtained.

(4) Leak by Surface (Skin) Current

Figure 12B:
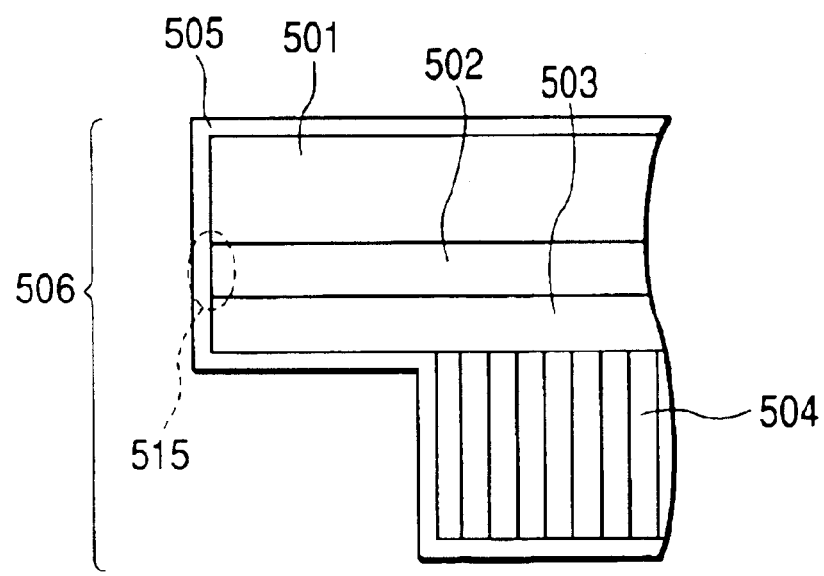

FIG. 12B is a schematic cross sectional view for explaining a leak by a surface (skin) current. When forming areas (sizes) of the base member 501, the insulating layer 502, and the reflective layer 503 or forming areas (sizes) of the insulating layer 502 and the reflective layer 503 are identical and end portions are aligned, a distance between the conductive base member 501 and the reflective layer 503 in an end surface 515 corresponds to only the thickness of the insulating layer 502. For example, when the thickness of the insulating layer 502 is given by 1 μm, the distance between the base member 501 and the reflective layer 503 in the end surface 515 is 1 μm.

A small surface (skin) current flows into the end surfaces 515 of the base member 501, the insulating layer 502, and the reflective layer 503. This surface current flows between the conductive base member 501 and the reflective layer 503. However, the amount of current is inversely proportional to the distance between the base member 501 and the reflective layer 503 and the surface current becomes hard to flow with increasing the distance.

Also, electrochemical corrosion is cased by flowing a current between the conductive base member 501 and the reflective layer 503. Thus, it is preferable that the distance between the base member 501 and the reflective layer 503 is maximized.

As described above, in order to further improve durability to temperature and humidity to electrochemical corrosion, it is required that the above reasons (1) to (4) are solved.

FIGS. 13A and 13B and FIGS. 14A and 14B are schematic cross sectional views indicating a structure of this embodiment in order to further improve an effect for preventing electrochemical corrosion.

Figure 13A:
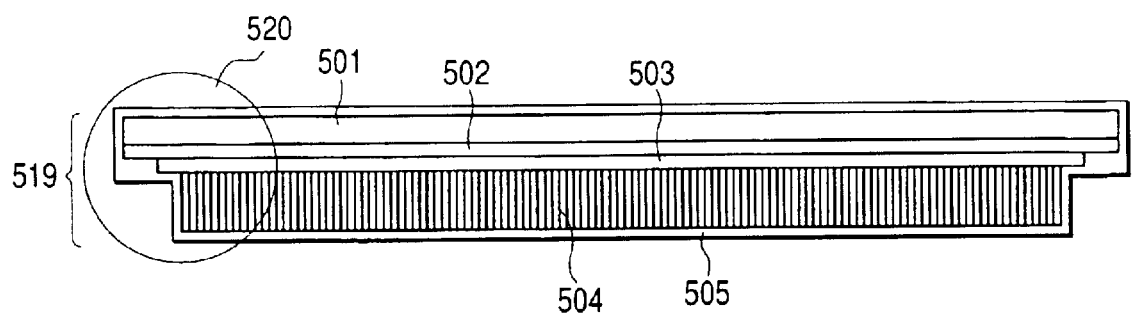
FIG. 13A is a cross sectional view of a scintillator panel in which a size of the reflective layer is smaller than that of the insulating layer and FIG. 13B is a partially magnified view thereof.
Figure 13B:
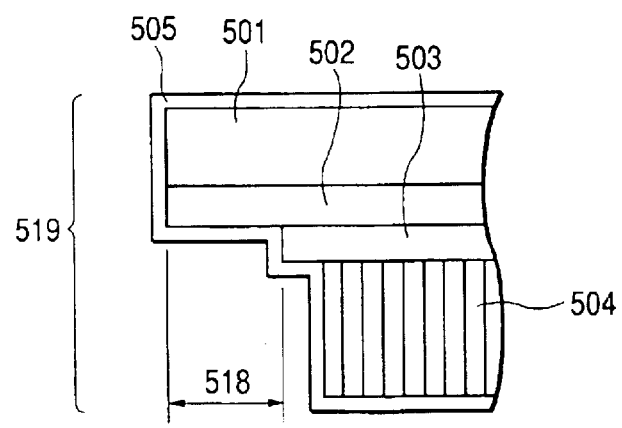

As shown in FIGS. 13A and 13B, when the reflective layer 503 is formed on the conductive base member 501 and the insulating layer 502, it is formed so as to keep a clearance 518 at a distance from the end portion of the insulating layer 502.

As means for keeping the clearance of the reflective layer, a method of adhering a tape onto the insulating layer 502 in advance and performing masking, a method of performing masking using a substrate holder at sputtering, or a method of etching only the end portions in a later step may be used.

Thus, since the distance between the conductive base member 501 and the reflective layer 503 becomes long, continuity due to wraparound and continuity due to moisture absorption are suppressed. Also, with respect to the surface current, since the distance becomes long, a resistance is increased. Therefore, an insulation effect between the conductive base member 501 and the reflective layer 503 can be further improved.

Figure 14A:
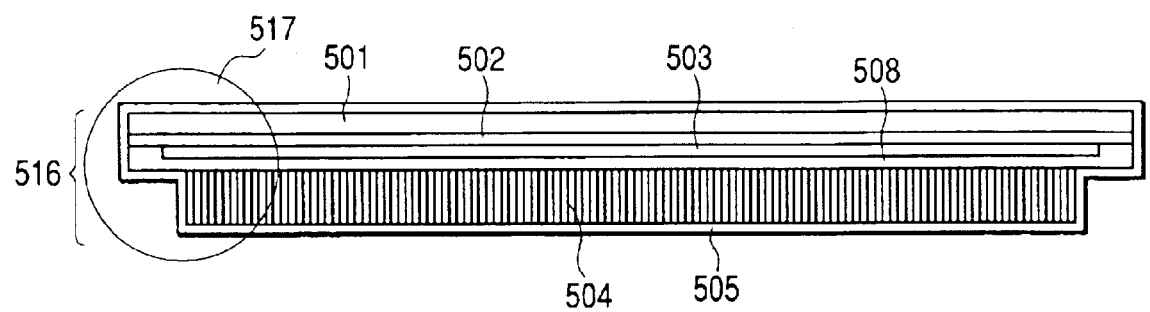
FIG. 14A is a cross sectional view of a scintillator panel in which a protective film for the reflective layer is provided in the structure shown in FIGS. 13A and 13B and FIG. 14B is a partially magnified view thereof.
Figure 14B:
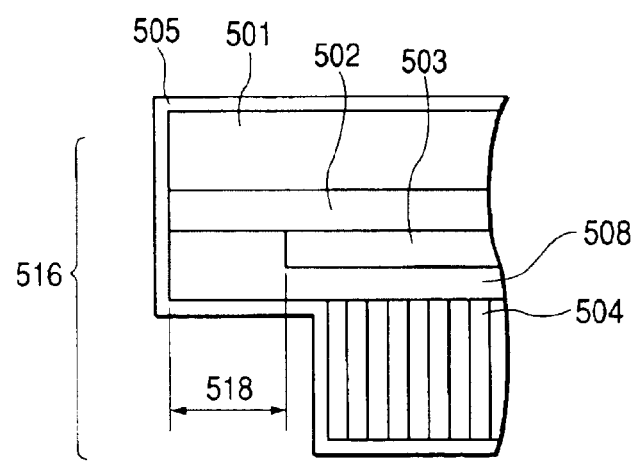

FIGS. 14A and 14B show an example in the case where the protective layer 508 for the reflective layer is formed on the reflective layer 503 in addition to the structure shown in FIGS. 13A and 13B.

As indicated in this example, when the full circumference of the reflective layer 503 is enclosed with an insulating material such as a resin, the occurrence of electrochemical corrosion is reduced. In particular, when the end portions are covered with the insulating layer 502 and the protective layer 508 for the reflective layer, factors of continuity by the outside, for example, moisture, a foreign object, and the like can be completely prevented.

Also, when the insulation property in only the end portions is improved, the same material can be used for the protective layer 508 for the reflective layer and the insulating layer 502 to improve the adhesion in the end portions or plasma processing or corona discharge processing can be also performed for only the end portions to improve the wettability and the adhesion.

Also, even when the surfaces of the end portions are made rough, the distance between the base member and the reflective layer becomes long by uneven portions. Thus, the surface current is hard to flow.

In addition, it is an effective method that the full circumference of not only the reflective layer itself but the conductive base member is covered with the insulating layer by a method such as dipping.

FIGS. 15A to 15E are schematic cross sectional views of a radiation detection device of this embodiment and show manufacturing steps thereof.

Figure 15A:
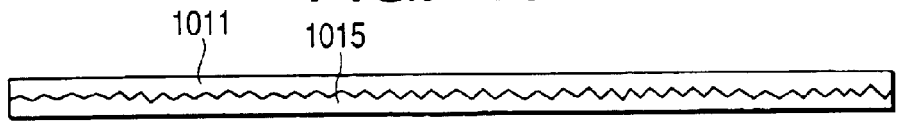
FIGS. 15A, 15B, 15C, 15D and 15E are schematic cross sectional views of a scintillator of Embodiment 6.

In FIG. 15A, amorphous carbon 1011 is used as a base member for forming a scintillator and made rough such that surface roughness becomes about 0.2 $\mu$m to improve the adhesion power to an insulating layer laminated thereon by an anchor effect.

The insulating film is provided on the base member 1011. Note that a polyimide resin 1011 having a heat resistance such as it is resistant to 200° C. or higher and a volume resistivity of $1 \times 10^{10}$ $\Omega$cm or more is preferably used as a material of the insulating layer.

The polyimide resin is applied by a spin coat method such that the thickness becomes 5 $\mu$m and cured.

Figure 15B:
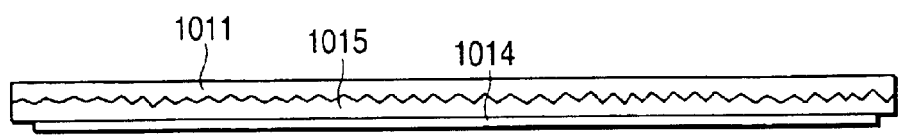

FIG. 15B is a schematic view in the case where a reflective layer formed on the amorphous carbon 1011 and the polyimide resin 1015.

Aluminum having high reflectance through approximately the entire region of visible light is used as a material of a reflective layer 1014 and formed by sputtering.

Figure 15C:
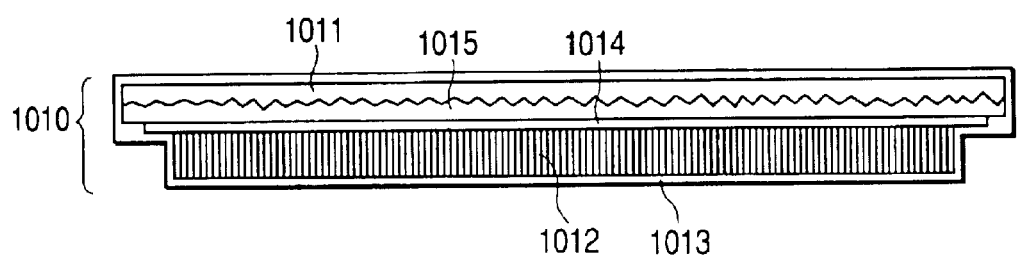
Figure 15D:
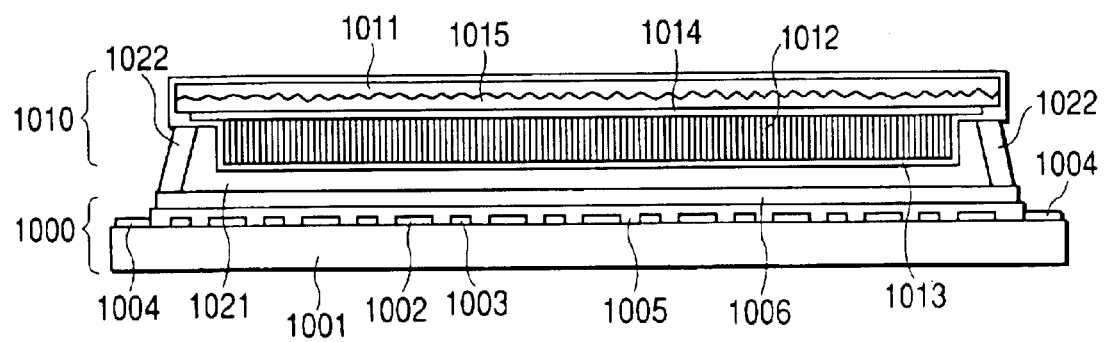
Figure 15E:
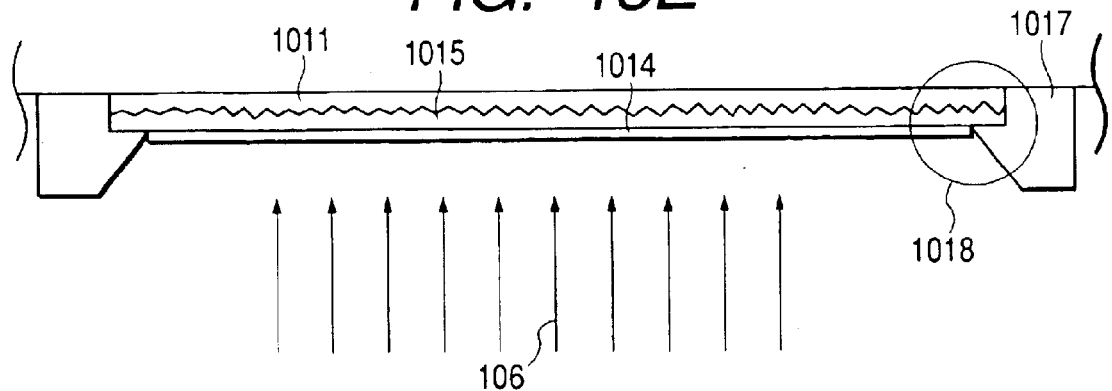

At sputtering, as shown in FIG. 15E, it is located such that outer end portions 1018 of the amorphous carbon 1011 and the polyimide resin 1015 can be masked at 6 mm by using a substrate holder 1017.

Thus, the outer portions are masked by the substrate holder 1017 to limit a forming area (forming region) of the reflective layer 1014 and to prevent wraparound to the end portions of the amorphous carbon 1011 and the polyimide resin 1015. Therefore, the distance between the aluminum 1014 and the amorphous carbon 1011 can be increased.

As a result, the insulation between the amorphous carbon 1011 and the aluminum 1014 is ensured by preventing wraparound of the aluminum 1014 and the continuity due to moisture absorption and the influence of a surface current can be relaxed.

FIG. 15C shows an example in the case where a column-shaped crystal phosphor made of alkali halide, for example, CsI (cesium iodide) 1012 is formed on the substrate shown in FIG. 15B by evaporation and then the entire substrate is covered with parylene 1013 for a protective layer. The CsI (cesium iodide) 1012 is formed by vacuum evaporation. At annealing after evaporation, a substrate temperature is increased to about 200° C. However, since the polyimide resin 1015 having a heat resistance is used for the insulating film, insulation breakdown between the base member 1011 and the aluminum 1014 due to dissolving is not caused.

Also, the parylene 1013 for the protective layer is a material having high transmittance in visible light and low moisture permeability. It is suitable as a material formed between the phosphor layer and a sensor panel and used for coating the full circumference of the surface by CVD (chemical vapor deposition).

As shown in FIG. 15D, the thus formed scintillator panel 1010 is bonded to the sensor panel through a heat curable type acrylic based resin 1021 to obtain the radiation detection device.

In FIG. 15D, reference numeral 1000 denotes a sensor panel. This sensor panel includes a glass substrate 1001, a photoelectric conversion element portion 1002 composed of a photosensor and a TFT using amorphous silicon respectively, a wiring portion 1003 for transmitting an electrical signal converted by the photoelectric conversion element portion 1002, an electrode contact layer (portion) 1004 for leading the electrical signal transmitted through the wiring portion 1003 to the outside, a first protective layer 1005 made of silicon nitride or the like, and a second protective layer 1006 made of polyimide or the like.

The sensor panel 1000 and the scintillator 1010 are bonded to each other through an adhesive 1021 and the surroundings are sealed with a sealing member 1022. Note that the photoelectric conversion element portion 1002 can preferably detect visible light from the phosphor layer 1012. Thus, an MIS type sensor or PIN type sensor made of amorphous silicon or the like respectively may be used. Also, a TFT or a PIN type diode may be used as a switch. Further, a CMOS sensor or a CCD imaging element may be used. In this case, the substrate 1001 made of crystal silicon is used.

Also, tiling may be made using plural units of the radiation detection device shown in FIG. 15D according to applications. Further, with respect to the scintillator panel 1010, the example in the case where the base member 1011, the insulating layer, the reflective layer 1014, and the phosphor layer 1012 are laminated from the top of FIG. 15D in this order is indicated. However, the reflective layer 1014, the insulating layer, the base member 1011, and the phosphor layer 1012 may be laminated in this order.

In this embodiment, the example in the case where polyimide is used for the insulating layer 1015 is indicated. In addition to this, a divinylsiloxanebisbenzobutene based resin, a methylxylsesquioxane based resin, polyamideimide, polyethersulfone, polyetherimide, aromatic polyester, and the like may be used. Further, when a resin has good adhesion to a material used for the base member 1011, it is not necessary to make the resin rough.

When the above organic material is used, the insulating layer 1015 can be formed to be thick (several $\mu$m to 20 $\mu$m). Thus, there is a merit such as it becomes a strong structure to insulation breakdown due to a foreign object and the like. Also, since it is not required that the base member 1011 is polished to obtain a mirror surface, a cost is reduced by that content and thus it is preferable.

(Embodiment 7)

Figure 16A:
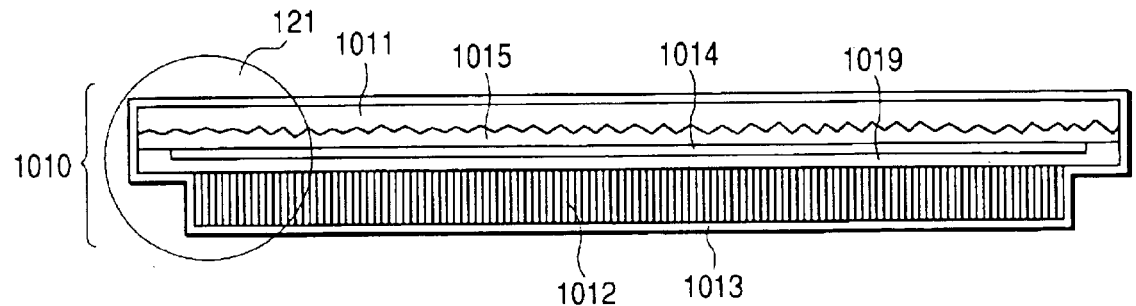
FIG. 16A is a schematic cross sectional view of a scintillator of Embodiment 7 and FIG. 16B is a partially magnified view thereof.
Figure 16B:
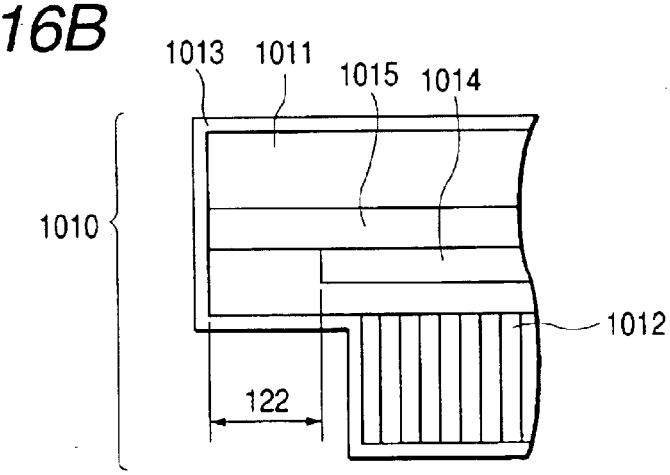

FIG. 16A and FIG. 16B are schematic cross sectional views of a scintillator panel of this embodiment. FIG. 16B is a magnified view of a portion of FIG. 16A.

Materials and forming methods, which are used a for the base member, the reflective layer, and the insulating layer are preferably identical to Embodiment 2.

In this embodiment, aluminum 1014 for the reflective layer is formed by sputtering while masking using a substrate holder, and then a polyimide resin 1019 made of the same material as the insulating layer is formed in an upper layer thereof as a protective film for the reflective layer by a spin coat.

Thus, when both surfaces of the aluminum 1014 for the reflective layer 1014 are covered with a polyimide resin for the insulating layer 1015 and the polyimide resin for the protective film 1019 for the reflective layer, since end portions of the reflective layer 1014 are also covered simultaneous with the aluminum, the insulation to the base member 1011 can be further improved.

When the reflective layer 1014 is sandwiched by using the polyimide resin for insulating layer 1015 and polyimide resin for the protective film 1019 for the reflective layer, the adhesion between the insulating layer and the protective film for the reflective layer in the end portions 122 can be improved and peeling of aluminum can be further prevented.

(Embodiment 8)

Figure 17:
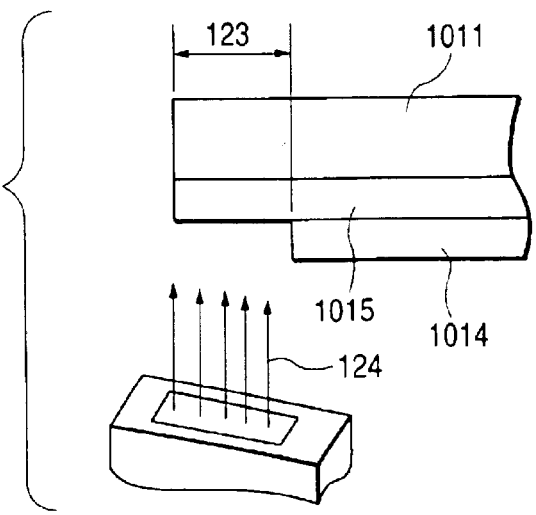
FIG. 17 is a schematic cross sectional view of a radiation detection device of Embodiment 8.

FIG. 17 is a schematic cross sectional view of a scintillator panel of this embodiment. In this embodiment, the same layer structure as Embodiment 7 is obtained. That is, a structure of a base member, an insulating layer, a reflective layer, a protective film for a reflective layer, a phosphor layer, and a protective layer is obtained and the same materials as Embodiment 7 are preferably used.

In this embodiment, before the polyimide resin for protective film for the reflective layer is formed, plasma processing using plasma 124 is performed to improve the wettability and the adhesion in the end portions 123. A rough surface effect, a cleaning effect, and activation are made by plasma processing, the wettability of the polyimide resin for protective film for the reflective layer, which is applied later can be improved, the adhesion in the end portions 123 is improved, and the insulation property between the reflective layer and the base member is increased.

Also, in addition to plasma processing, even when corona discharge processing or cleaning using a solvent such as IPA is performed, the adhesion is improved.

(Embodiment 9)

Figure 18A:
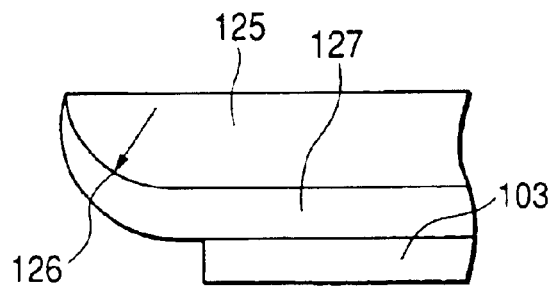
FIGS. 18A, 18B and 18C are schematic cross sectional views of a radiation detection device of Embodiment 9.
Figure 18B:
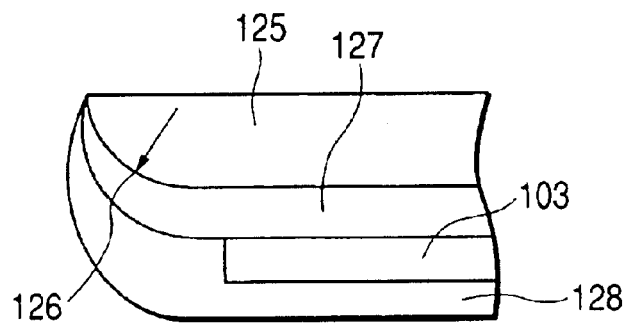
Figure 18C:
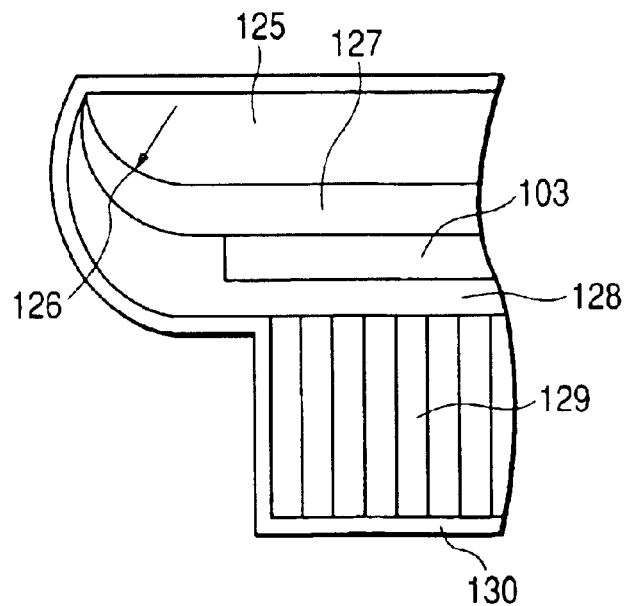

FIGS. 18A to 18C are schematic cross sectional views of a scintillator panel of this embodiment.

In this embodiment, the same layer structure and materials as Embodiments 6 and 7. Beveling is performed for the end portions of a base member 125 so as to be a radius of curvature R.

Beveling 126 is performed for a thickness of 1 mm in the base member 125 and it is set to be a radius of curvature R=3 mm.

Thus, when beveling is performed for the end portions of the base member 125, resin flow to the end portions at formation of the insulating layer becomes easy. On the other hand, when beveling is not performed, an insulating film 127 can be applied to the end portions which is not applied Therefore, the distance between the base member 125 and the reflective layer 1014 can be further increased.

Also, wraparound of a protective film 128 for a reflective layer, which is formed in an upper layer is also made to the end portions. Thus, an adhesion distance (area) of the insulating film 127 as a base is increased to further improve the insulation property. Reference numeral 129 denotes a phosphor layer formed by evaporation using CsI (cesium iodide) and 130 denotes parylene for a protective layer.

Also, with respect to beveling of the base member, there is an effect even when it is applied to Embodiments 1 to 5.

(Embodiment 10)

FIGS. 19A to 19D are schematic cross sectional views of a scintillator panel of this embodiment. In this embodiment, when a polyimide resin 131 for an insulating layer is formed for amorphous carbon 130 for a base member by dipping. A merit for forming the polyimide resin 131 for the insulating layer by dipping is that the full circumference of the amorphous carbon 130 can be coated with the polyimide resin 131 for an insulating layer having a heat resistance.

Figure 19A:
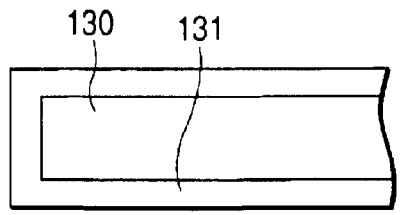
FIGS. 19A, 19B, 19C and 19D are schematic cross sectional views of a radiation detection device of Embodiment 10.
Figure 19B:
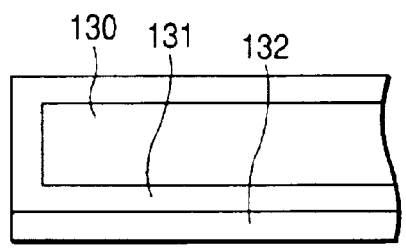

Thus, the full circumference of the amorphous carbon 130 is coated with the polyimide resin 131 to make the insulation in the base member side. Therefore, as shown in FIG. 19B, when a reflective layer 132 made of aluminum is formed, since it is not required that sputtering is performed during masking, an effective area of phosphor layer can be further increased.

Figure 19C:
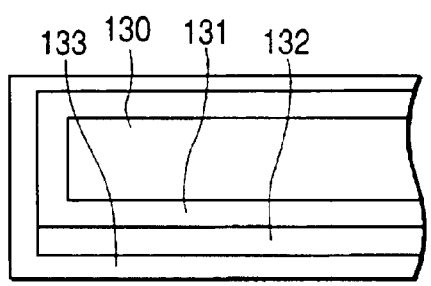
Figure 19D:
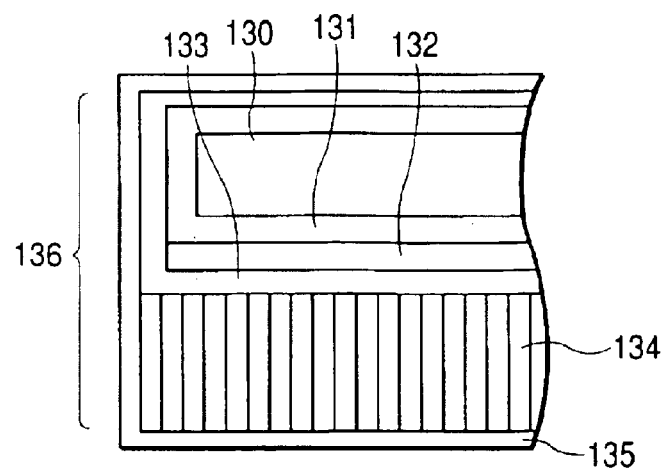

In FIG. 19C, a polyimide resin 133 for a protective layer for reflective layer is formed on the reflective layer 132 made of aluminum through the full circumference by dipping. After that, as shown in FIG. 19D, a phosphor layer (CsI) 134 is formed on approximately the entire surface of the base member. Then, parylene for a protective layer 135 is formed. Thus, a scintillator panel 136 is manufactured. In this embodiment, both the insulating layer 131 and the protective film 133 for the reflective layer are provided on the entire surface of the base member. However, even when either is provided, there is a sufficient effect. When both are provided, the effect is further improved.

Table 2 indicates a result in the case where durability tests to temperature and humidity are simultaneously performed for separate scintillator panels according to the configuration shown in FIG. 10A (structure of the base member, the insulating layer, the reflective layer, the phosphor layer, and the protective layer is obtained and the reflective layer is extended to the end surfaces of the insulating layer), Embodiment 6, and Embodiment 7.

TABLE 2

|  | Configuration Shown in FIG. 10A | Embodiment 6 | Embodiment 7 |
| --- | --- | --- | --- |
| Corrosion occurrence time | 1000 hours | 1200 hours | 2000 hours |

As can be seen from table 2, according to structures of Embodiments 6 and 7, the durability is further improved as compared with the structure in which end portions of the reflective layer are aligned to those of the insulating layer. Also, it is apparent that highest durability is obtained in Embodiment 7.

Condition: temperature is 70° C. and humidity is 90%.
Evaluation is visually performed at a time when electrochemical corrosion of aluminum is caused (the presence or absence of spot patterns).

(Embodiment 11)

FIG. 20 is a block diagram indicating a schematic structure of an X-ray diagnostic system of this embodiment. An X-ray 6060 generated in an X-ray tube 6050 is transmitted through a chest 6062 of a patient or a person to be examined 6061 and incident into a photoelectric conversion device 6040 in which a phosphor is mounted in the upper portion. The incident X-ray includes information with respect to an inner portion of the body of the patient 6061. The phosphor emits light in response to the incident X-ray. Photoelectric conversion for the emitted light is performed to obtain electrical information. This information is converted into digital information and image-processed by an image processor 6070 such that it can be observed on a display 6080 of a control room.

Also, this information can be transferred to a remote place through a transmission means such as a telephone line 6090 and can be displayed on a display 6081 or stored in a storage means such as an optical disk in a doctor room or the like as other place. Thus, a diagnosis by a doctor in the remote place is possible. Further, this information can be recorded in a film 6110 by a film processor 6100.

Note that the case where the radiation detection device is applied to the X-ray diagnostic system is described in this embodiment. However, the radiation detection device can be also applied to, for example, a radiation imaging system such as a nondestructive test apparatus.

What is claimed is:

1. A scintillator panel comprising a conductive base member for supporting a phosphor layer and a reflective layer for reflecting light converted by the phosphor layer:
   wherein a first insulating layer is located between the conductive base member and the reflective layer and contacts said conductive base member, and a second insulating layer is located between said first insulating layer and said reflective layer.

2. A scintillator panel according to claim 1, wherein said phosphor layer is crystalized in a column shape.

3. A scintillator panel according to claim 1, wherein the conductive base member is made of a material including amorphous carbon.

4. A scintillator panel according to claim 1, wherein a volume resistivity of a contact portion of the insulating layer, which is in contact with th reflective layer is $1 \times 10^{10}$ Ωcm or more.

5. A scintillator panel according to claim 1, wherein the conductive base member is made rough such that a difference between concave and convex in a surface on which the insulating layer is formed becomes 0.02 μm to 5 μm.

6. A scintillator panel according to claim 1, wherein an adhesion between said second insulating layer and said reflective layer is higher than an adhesion between said first insulating layer and said reflective layer.

7. A scintillator panel according to claim 1, wherein both the first insulating layer and the second insulating layer are formed by a chemical vapor deposition method, the first insulating layer is formed with a predetermined thickness, and then the second insulating layer is formed by changing a gas component.

8. A scintillator panel according to claim 1, wherein the reflective layer is made of a material including one selected from the group consisting of aluminum, silver, copper, and gold.

9. A scintillator panel according to claim 1, wherein the conductive base member and the reflective layer are made of different materials.

10. A scintillator panel according to claim 1, wherein the conductive base member is made of a material having a volume resistivity of $1 \times 10^{10}$ Ωcm or less.

11. A scintillator panel according to claim 1, wherein beveling with a radius of curvature R=1 mm or more is performed end surfaces of the base member.

12. A radiation detection device comprising a scintillator panel as claimed in claim 1, wherein
   a sensor panel has a photoelectric conversion element for converting light emitted from the scintillator panel side into an electrical signal and a wiring portion for transmitting the electrical signal converted by the photoelectric conversion element and is bonded to the scintillator panel.

13. A radiation detection system comprising:
   signal processing means for processing a signal from the radiation detection device according to claim 12;
   recording means for recording the signal from the signal processing means;
   display means for displaying the signal from the signal processing means;
   transmission processing means for transmitting the signal from the signal processing means; and
   a radiation generating source for generating the radiation.

14. A scintillator panel according to claim 1, wherein said first insulating layer is made of an organic material, and said second insulating layer is made of inorganic material.

15. A scintillator panel comprising a conductive base member for supporting phosphor layer and a reflective layer for reflecting a light converted by said phosphor layer wherein
   a flattened layer being located between said conductive base member and said reflective layer and contacting said conductive base member;
   an insulating layer located between said flattened layer and said reflective layer.

16. A scintillator panel according to claim 15, wherein said flattened layer is made of an organic material, and said insulating layer is made of an inorganic material.

* * * * *

UNITED STATES PATENT AND TRADEMARK OFFICE
CERTIFICATE OF CORRECTION

PATENT NO.     : 6,835,936 B2
DATED          : December 28, 2004
INVENTOR(S)    : Satoshi Okada et al.

It is certified that error appears in the above-identified patent and that said Letters Patent is hereby corrected as shown below:

Column 15,
Line 28, "resin 1011" should read -- resin 1015 --.

Column 16,
Line 59, "a" should be deleted.

Column 19,
Line 24, "th" should read -- the --.

Column 20,
Line 8, "end" should read -- for end --.

Signed and Sealed this

Thirteenth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 6,835,936 B2
APPLICATION NO. : 10/061319
DATED : December 28, 2004
INVENTOR(S) : Satoshi Okada et al.

It is certified that error appears in the above-identified patent and that said Letters Patent is hereby corrected as shown below:

COLUMN 15
Line 28, "resin 1011" should read --resin 1015--.

COLUMN 16
Line 59, "a" should be deleted.

Signed and Sealed this

Eighteenth Day of July, 2006

JON W. DUDAS
*Director of the United States Patent and Trademark Office*